United States Patent

Hardesty

[15] 3,656,516

[45] Apr. 18, 1972

[54] METHODS OF AND APPARATUS FOR UNWINDING A HELICALLY WOUND ELONGATED BODY

[72] Inventor: Edwin C. Hardesty, Perry Hall, Md.

[73] Assignee: Western Electric Company, Incorporated, New York, N.Y.

[22] Filed: Aug. 31, 1970

[21] Appl. No.: 68,376

[52] U.S. Cl. ......................................... 140/149, 18/DIG. 7
[51] Int. Cl. ........................................................ B21f 7/00
[58] Field of Search .............. 140/89, 147, 149; 29/452, 624; 18/1 R, 19 C, DIG. 7

[56] References Cited

UNITED STATES PATENTS

| | | | |
|---|---|---|---|
| 2,718,659 | 9/1955 | Judisch | 140/149 |
| 2,718,660 | 9/1955 | Day | 140/149 |
| 3,016,571 | 1/1962 | Adams | 18/19 |
| 3,226,767 | 1/1966 | Howell, Jr. | 18/19 |

Primary Examiner—Lowell A. Larson
Attorney—W. M. Kain, R. P. Miller and Don P. Bush

[57] ABSTRACT

A mandrel having a telephone cord coiled thereon is mounted vertically and rotatably with one end of the cord attached to a spindle mounted rotatably on a reciprocally movable carriage. The carriage is moved relative to the mandrel to uncoil the cord and successive sections of the cord are moved axially horizontally and generally perpendicular to a stationary plate positioned between the mandrel and the carriage at the same time the axis of the cord is moved transversely vertically so that portions of the cord adjacent to the other end thereof are moved into, and pulled through, a slot formed in the plate. Simultaneously, the ends of the cord are twistingly rotated relative to each other to reverse the direction of the helical coil. As the other end of the cord is disengaged from the mandrel, the last few convolutions of the cord spring together and expand radially on the mandrel side of the plate until the other end of the cord engages a pair of spaced pins attached to the mandrel-side of the plate on opposite sides of the slot. The pins retain the last few convolutions of the cord on the mandrel-side of the plate, and the cord is maintained strung between the spindle and the plate to facilitate removal by an operator.

15 Claims, 4 Drawing Figures

INVENTOR
E.C. HARDESTY

BY E. W. Somers
ATTORNEY

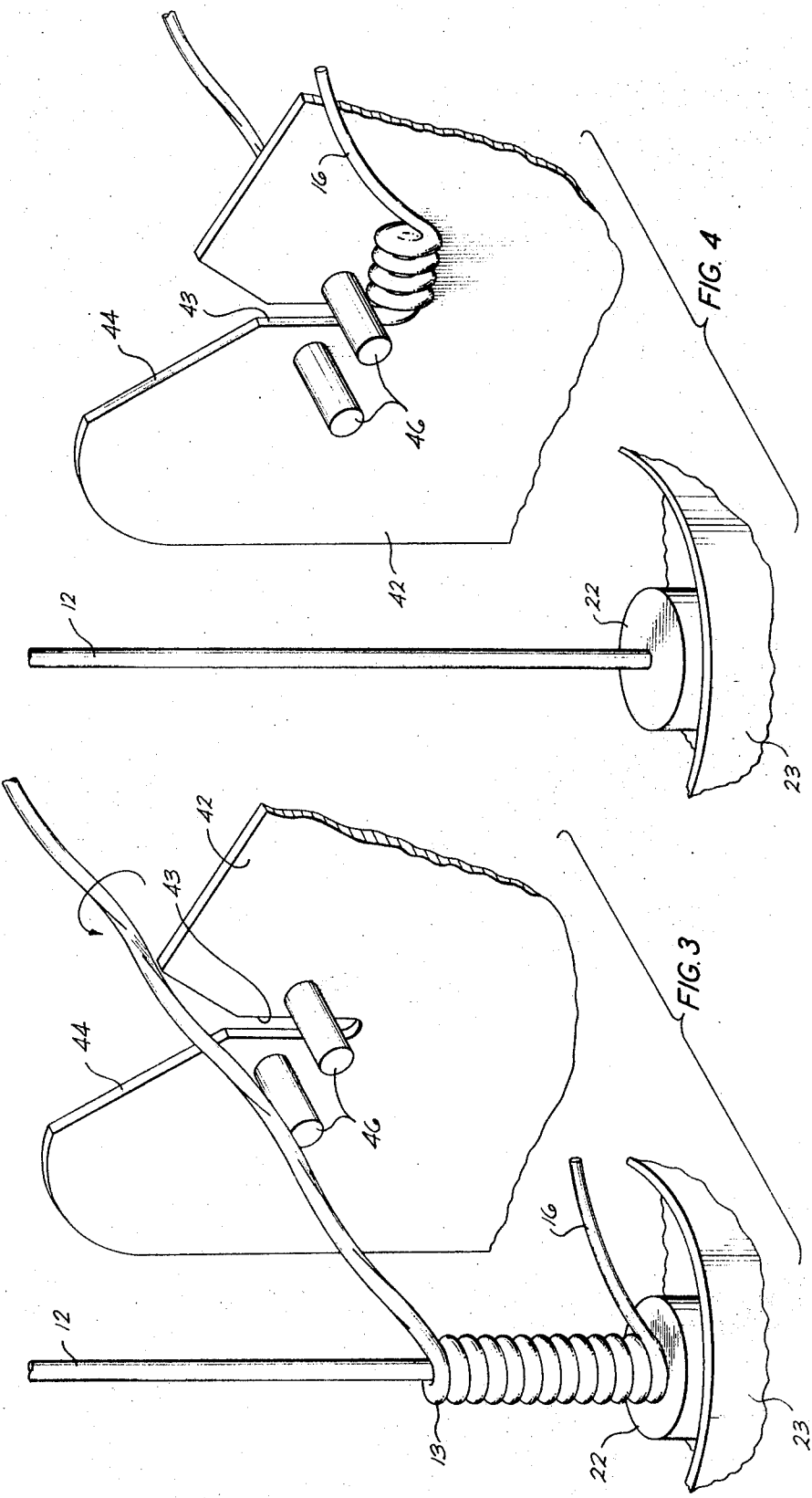

METHODS OF AND APPARATUS FOR UNWINDING A HELICALLY WOUND ELONGATED BODY

BACKGROUND OF THE INVENTION

1. Field of the Invention

This invention relates to methods of and apparatus for unwinding a helically wound elongated resilient body, and, more particularly, to methods of and apparatus for unwinding and reversing the pitch of a retractile cord wound helically on a mandrel.

2. Description of the Prior Art

Electrical retractile cords, which are referred to in the art as spring cords, are widely used in the communications industry and in connection with various electrical applicances. One example of an electrical retractile cord, hereinafter referred to as a spring cord, is the spring cord utilized to connect the handset of a telephone instrument to the telephone base. The spring cord is manufactured with a major portion thereof in the form of a compact helical coil, which may be extended by a slight tension and which will return to the compact form when the tension is relieved.

In a preferred process of manufacturing spring cords for telephone instruments, a predetermined length of jacketed, multiconductor cordage is wound in a helix along the length of a rotating and longitudinally moving mandrel, preferably as disclosed in U.S. Pat. No. 3,024,497 issued on Mar. 13, 1962 to E. C. Hardesty and D. L. Myers As disclosed in that patent, the cordage is first cut to a predetermined length, and is then tipped and banded and wound subsequently on a mandrel. After the winding operation, the trailing end of the cordage is clamped to the mandrel, and then the mandrel with the helically coiled cordage clamped thereto is placed in an oven and heat treated.

In one type of preferred cordage, the jacketing material comprises a plasticized polyvinyl-chloride composition having elastic properties, as disclosed in U.S. Pat. No. 3,037,068 issued on May 29, 1962 to H. L. Wessel. The cord is heated on the mandrel to a temperature above the softening point of the polyvinyl-chloride composition, to relieve strains in the jacketing material and to set the cord in a helical coil and is then cooled to room temperature. After cooling, the heat-treated cord is removed from the mandrel and the pitch of the helical coil is reversed in order to provide a spring cord having retractility, as disclosed in U.S. Pat. No. 2,920,348 issued on Jan. 12, 1960 to E. L. Franke, Jr.

As disclosed in the U.S. Pat. No. 2,920,348, an apparatus may include a pair of spaced endless members each having a plurality of opposed workholders secured thereon, between pairs of which partially formed spring cords are secured. As the endless members are moved in synchronism, the opposed holders are rotated in opposite directions to reverse the helices of the coil of each cord and to impart an overtwist thereto. An endless chain with fingers thereon serves to impart tension to the spring cord to prevent knotting and kinking thereof. Subsequently, the direction of rotation of the holders is reversed to remove a predetermined amount of the overtwist from the cords.

A new and improved method of and apparatus for stretching a spring cord by controlled, varying amounts during helix-reversing and overtwisting operations to produce a finished spring cord is disclosed in U.S. Pat. No. 3,087,199, issued on Apr. 30, 1963 to E. L. Franke, Jr. et al.

Apparatus is also commercially available for unwinding a spring cord from a mandrel on which the cord has been wound helically and heat-treated and for simultaneously reversing the pitch of the helices of the coil of the cord.

An apparatus for removing the heat-treated spring cord from the mandrel and for reversing the pitch of the helices of the coil includes a frame having facilities for mounting vertically rotatably a plurality of mandrels in a spaced parallel array. A reciprocally movable carriage having a plurality of spindles rotatably mounted thereon is supported from the frame with each of the spindles aligned with an associated one of the mandrels.

In operation, an operator positions a full complement of the mandrels in the frame, each of the mandrels having a retractile cord wound helically thereon, and clamps one free end of each of the spring cords to the associated aligned one of the spindles. The operator then controls the operation of the apparatus to move the carriage linearly away from the mandrels to unwind the spring cords from the associated mandrels. Simultaneously, the spindles are rotated in such a manner as to reverse the pitch of the helix of the spring cords being unwound from the mandrels. Moreover, a predetermined amount of overtwist is imparted to the cords to induce additional torque to the cords which is of help in distributing evenly the forces imparted to the cord throughout the entire length of the cord.

As the carriage reaches the end of the path of travel in a first direction away from the mandrels, the trailing end of each of the spring cords is pulled free of the mandrels. The release of the trailing ends of the spring cords from the mandrels permits the inherent spring-like characteristics of the cords to cause the convolutions of the cords to spring together toward the ends of the spring cords still held in the reversing spindles at which time the overtwist is released from the cords. As a result of the predetermined amount of overtwist imparted to the cord, the convolutions of the finished product are more uniform and more compact, i.e. smaller in diameter. Also, the movement of the carriage is changed to a second direction opposite to the first direction to return the carriage to an initial position in the vicinity of the operator and with the unwound reversed cords dangling from the spindles.

Manufacturing economies dictate the simultaneous reversal of more than one spring cord in each apparatus which represents considerable investment. No problems are apparent when using an apparatus of the above-described type for reversing relatively short spring cords, e.g. 4 feet in length. However, when using the above-described apparatus for reversing longer spring cords, problems may occur. In order to unwind all of the convolutions from the mandrel, it becomes necessary to induce substantial additional twist into the cords in the same amount of carriage travel.

When the trailing ends of the longer cords are pulled from the associated mandrels and the convolutions spring together, the length of the cords may cause the cords to become entangled thus requiring additional operator time to disentangle the cords before removing the cords from the spindles for transportation to a subsequent work station. Moreover, the additional twist imparted to the spring cords generally causes the spring cords to knot up and kink which results in a loss of the normal helical shape of the cords and the accompanying successively ordered convolutions which also require additional operator attention to correct.

Even if an apparatus having a longer bed and longer length of carriage travel was used for the reverse recoiling of the longer variety of spring cords, entanglement may still occur when the trailing ends of the cords are released from the mandrels and the convolutions spring together.

Still further, manufacturing economies may be realized by using higher speeds for the carriage travel and the rotation of the spindles. These modifications could result in knotting of the individual cords and entanglement of the associated cords when using such an apparatus for the reverse recoiling of even the shorter spring cords.

One solution would be to compartmentize the individual cords by using separating partitions between the adjacent cords. The partitions overcome the problem of entanglement of adjacent ones of the cords, but the knotting-up of the individual cords may still occur.

The problems described may be surmounted by devising methods of and apparatus for maintaining the helical shape of the spring cords with the convolutions of each of the cords in a successive ordered array after the cords have been unwound from the associated mandrels and reverserecoiled to permit an operator to remove the cords from the apparatus without the necessity of disentangling and/or unknotting the cords.

If the other end of each of the cords were engaged after the other ends are unwound from the associated ones of the mandrels, then, not only would the problem of entanglement of adjacent cords and knotting of individual cords be solved, but, also, provisions could be made for removing a predetermined amount of the overtwist. The ability to remove a predetermined amount of the overtwist permits control over the uniformity and degree of compactness of the convolutions of the cord.

At the end of the path of travel in the first direction, the direction of rotation of the spindles is reversed to remove the overtwist and the carriage is moved in a second direction opposite to the first direction to return the carriage to an initial position. The reverse rotation to remove the overtwist may be accomplished while the carriage is stationary at the end of the path of travel in the first direction or while the carriage is being returned to the initial position.

SUMMARY OF THE INVENTION

It is therefore another object of this invention to provide methods of and apparatus for unwinding a helically wound elongated body in such a manner as to secure the trailing end of the elongated body when the elongated body is completely unwound.

It is therefore another object of this invention to provide methods of and apparatus for unwinding spring cords wound individually on mandrels and for reversing the pitch of the helices of the spring cords with facilities for preventing the entanglement of adjacent ones of a plurality of the cords as the cords are unwound from the mandrels and for preventing knotting of individual ones of the cords.

A method of unwinding a helically wound elongated body which illustrates certain features of the present invention, may include the steps of holding one end of the elongated body, causing relative movement between the one end and unwound portions of the elongated body to unwind the resilient body and move the axis of successive unwound portions transverse of a confining device, and engaging unwound portions of the elongated body adjacent the trailing other end of the elongated body prior to the elongated body being completely unwound to secure the trailing end of the elongated body when the elongated body is completely unwound.

Apparatus illustrating certain features of the invention may include facilities for mounting rotatably a workholder having an elongated body coiled helically thereon with provisions for holding one end of the coiled elongated body in a rotatably mounted spindle and causing relative movement between the one end and the unwound portions of the elongated body to unwind the body from the workholder with provisions for engaging only portions of the unwound portions of the elongated body prior to the elongated body being unwound completely to secure the other end of the elongated body when the elongated body is completely unwound.

Other objects and features of the present invention will be more readily understood in the following detailed description of specific embodiment thereof when read in conjunction with the accompanying drawings in which:

BRIEF DESCRIPTION OF THE DRAWINGS

FIG. 3 is an enlarged detailed view of a portion of the plate and depicting one of the slots with a pair of spaced pins attached to and projecting laterally of the plate on the mandrel side thereof with the unwinding of the cord having proceeded to where portions of the cord adjacent the trailing end thereof on the mandrel are about to be moved transversely into and through the slot while being pulled axially generally perpendicularly of the plate by an associated one of the spindles on the carriage.

FIG. 4 is an enlarged detail view of the slot and portion of plate shown in FIG. 3 at a later instant of time when the trailing end of the cord had been unwound from the mandrel and the last few convolutions of the cord are engaged with one of the pins and are retained on the mandrel-side of the plate to maintain the cord strung between the plate and the carriage.

DETAILED DESCRIPTION

Figure 1:
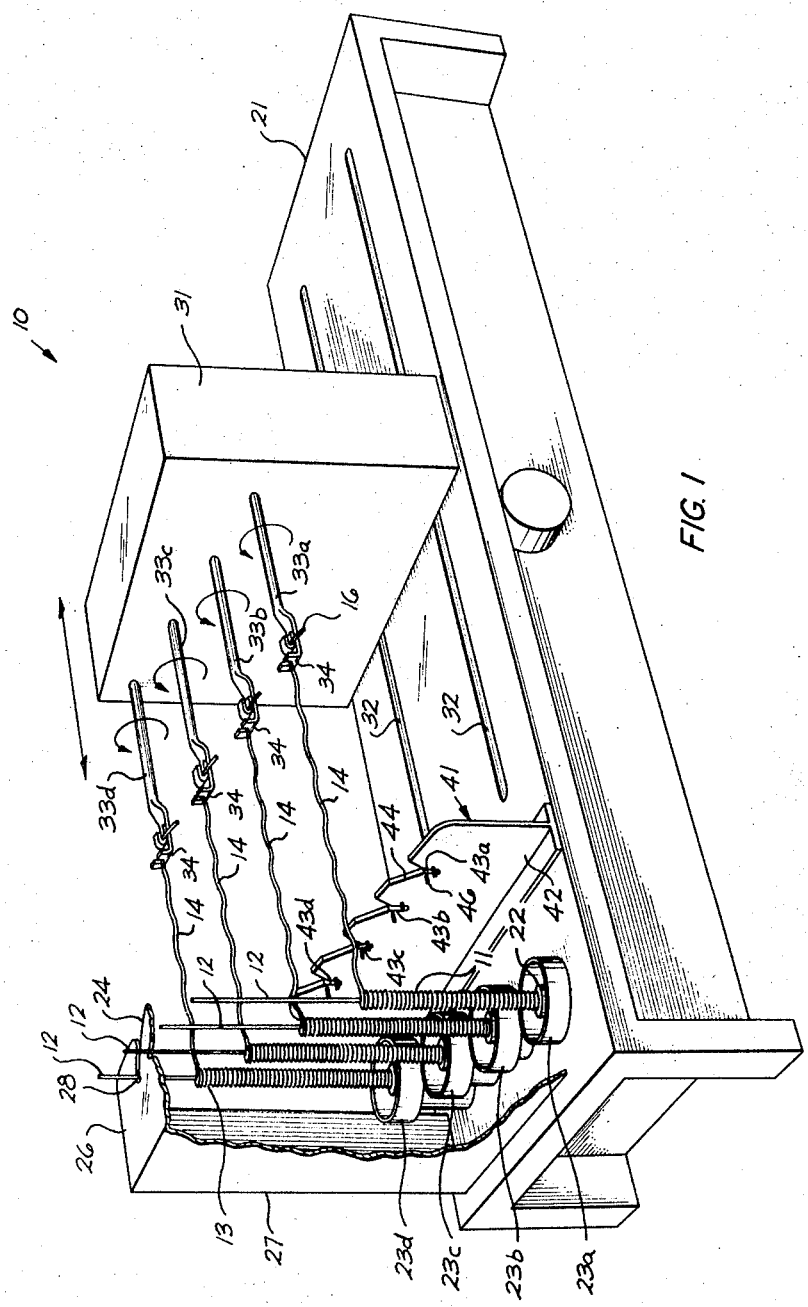
FIG. 1 is a perspective view of an apparatus which embodies certain principles of this invention which includes a reciprocally movable carriage having a plurality of rotatably mounted spindles thereon for moving away from plural rotatably mounted mandrels having cords coiled thereon to unwind the cords from the mandrels and move portions of the cords adjacent the trailing ends thereof through associated ones of a plurality of slots formed in a plate positioned between the mandrels and the carriage.

Referring now to FIG. 1, there is shown an apparatus 10, which is used to carry out the principles of the method of the invention for unwinding a helically wound elongated body, and, in particular, for unwinding and reversing a plurality of retractile or spring cords 11—11, each of the cords being wound helically on a mandrel 12. The details of construction of the mandrel 12 together with a description of the structure of the cord 11 and the coiling of the cord on the mandrel 12 may be found by referring to U.S. Pat. No. 3,024,497, issued on Mar. 13, 1962 to E. C. Hardesty and D. L. Myers.

Each of the spring cords 11—11 has a central section consisting of a plurality of closely-packed helical turns or convolutions 13—13 (see also FIG. 3) of a jacketed cordage 14 and a pair of end portions 16—16. The jacketed cordage 14 includes a core composed of a plurality of individually insulated conductors (not shown) preferably tinsel conductors, positioned parallel to each other and which may be enclosed in a paper tape. The jacketing material is preferably extruded over the paper-covered core to form a long, straight length of the jacketed cordage 14. Portions of the jacketed cordage are then wound into helical form, being cut to length either after, or preferably before, the helix-winding operation.

A portion of the jacket adjacent to each of the end portions 16—16 of the spring cord 11 is stripped from the conductors, after which the spring cord is terminated by a tipping and banding operation. The stripping, tipping and banding of the cord 11 may be performed after the helix-winding operations; however, a predetermined straight length of the jacketed cordage 14 may be cut and the ends stripped, tipped and banded previous to coiling the helical form. This latter sequence of operations is preferred since it is easier to cut, strip, tip and band the cordage before coiling rather than after, and such sequence is more susceptible to mass-production assembly techniques.

After a predetermined length of the jacketed cordage 14 has been wound helically on one of the mandrels 12—12 by a coiling operation such as the coiling operation described in the above-mentioned U.S. Pat. No. 3,024,497, the cord 11 is conveyed to a heat-treating oven (not shown) to set the cord in a helical shape. The apparatus 10 is adapted to receive and hold a plurality of the mandrels 12—12, each of the mandrels having a heat-set retractile cord 11 wound helically thereon in preparation for unwinding the cord from the associated mandrel, and reversing the helices of the coil.

As can best be seen in FIG. 1, the apparatus 10 includes a base 21 having a plurality of spaced, rotary bearing blocks 22—22 at one end thereof, each of the bearing blocks being mounted in a support 23. The bearing block supports 23—23, further designated 23a to 23d, are mounted on the frame 21 and are spaced transversely across the base in a stepped fashion from the foreground of the apparatus 10 to the rear thereof, as viewed in FIG. 1. Each of the bearing blocks 22—22 is adapted to receive one end of one of the mandrels 12—12 and to hold the mandrel so that the mandrel may be turned rotatably therein. The other end of each of the mandrels 12—

12 is received in an associated one of a plurality of slots 24—24 cut in a top portion 26 of a bracket 27 that is attached to the one end of the base 21.

The unwinding of the cords 11—11 from associated ones of the mandrels 12-12 involves the imparting of forces to the cords and the associated mandrels. The mandrels 12—12 are subjected to forces directed transverse of the longitudinal axes of the mandrels and generally parallel to the longitudinal axis of the base 21. These forces tend to pivot the mandrels 12—12 within the associated ones of the bearing blocks 22—22 to pull the top ends thereof out of the associated ones of the slots 24—24.

The slots 24—24 are cut in the top portion 26 of the bracket 27 so that the mandrels 12—12 are held securely in a vertical position parallel to one another as is shown in FIG. 1 during the unwinding of the cords 11—11 therefrom. Accordingly, the slots 24—24 are cut angularly of the top portion 24 with a nesting opening 28 formed at the interior end of each of the slots. The top portions of the mandrels 12—12 are received in associated ones of the slots 24—24 within the nesting portions 28—28 during the unwinding of the cords 11—11. With this arrangement, the forces exerted on the mandrels 12—12 are oblique of the slots 24—24 and do not pull the mandrels out of the associated ones of the slots.

In order exert pulling forces to ones of the end portions 16—16 of the cords 11—11 to unwind the cords from the associated ones of the mandrels 12—12, a carriage 31 is mounted for reciprocal movement in a pair of spaced ways 32—32 on the base 21. A plurality of spindles 33—33, designated further 33a—33d, are mounted rotatably on the carriage 31 with each of the spindles associated with one of the bearing block supports 23a—23d respectively.

The spindles 33a—33d are mounted on the carriage 31 in an ascending arrangement beginning in the foreground of the carriage as viewed in FIG. 1 to correspond to the stepped arrangement of the bearing block supports 23a—23d, respectively. The arrangement of the bearing block supports 23a—23d and associated ones of the spindles 33a—33d is advantageous from the standpoint of bio-mechanics in that the arrangement facilitates operator insertion and removal of the mandrels 12—12 and the attachment of the end portions 16—16 of the cords 11—11 to the spindles.

Each of the spindles 33—33 has a bifurcated end 34 having upturned and portions 36—36 through which the end portion 16 of an associated cord 11 is passed, and a U-shaped portion 27 (see FIGS. 1 and 2) spaced from the upturned end portions for receiving one of the free end portions 16—16 of the cord to secure the cord to the spindle. It should also be observed that the apparatus 10 may accommodate cords 11—11 having free end portions 16—16 or having end portions which have been terminated. The spindles 33—33 are driven in synchronism by an interconnected drive (not shown) which is controlled by an operator.

The spindles 33—33 are turned in a first rotary direction, counterclockwise as shown in FIG. 1, to twistingly rotate the ends of the cords 11—11 relative to each other to reverse the convolutions 13—13 of the cords as the carriage 31 is moved linearly away from the mandrels 12—12 to simultaneously unwind the cords from the associated mandrels. Moreover, the relative rotation of the end portions 16—16 of each of the cords may be continued to impart a precise amount of overtwist to the cords to form additional helices of the reversed direction in the coiled portions thereof.

Sufficient torsional energy must be imparted from the spindles 33a—33d to the cords 11—11 on the associated mandrels 12—12 to reverse the last few ones of the convolutions 13—13 on each of the cords adjacent the trailing ones of the end portions 16—16 thereof. A predetermined amount of overtwist is imparted to each of the cords 11—11 by forming additional helices of the reversed direction in the coiled portion. The overtwist which is induced in the cords 11—11 by controlling the rotation of the spindles 33a—33d insures that an amount of energy is stored in the cords 11—11 so that when the last few ones of the convolutions 13—13 are unwound from the mandrels, the pitch of those helices will be reversed.

Subsequently the overtwist is removed from the spring cords 11—11. The convolutions 13—13 in the cords 11—11 after the overtwist has been removed are of substantially uniform diameter, pitch and spacing and are more compact, i.e., of a smaller diameter than would have been achieved without the overtwist. The removal of the overtwist is accomplished with the shorter spring cords 11—11 when the cord ends are released from the mandrels 12—12 and ones of the end portions 16—16 dangle from the associated spindles 33a—33.

The portions of the apparatus 10 described hereinsofar may be used to unwind and reverse simultaneously the helical coil of a plurality of spring cords 11—11 which are relatively short, e.g. 4 feet. When the carriage 31 has been moved relative to the rotatably mounted mandrels 12—12, from an initial position to approximately the end of a path of travel in the first direction, the shorter cords 11—11 will have been unwound completely from the associated ones of the mandrels with one free end portion 16 of each of the cords held in the bifurcated end 34 of the associated one of the spindles 33a—33d, and with the other free end portion 16 of each of the cords dangling therefrom.

The extent of movement of the carriage 31 is limited by the length of the base 21, which may be dictated by manufacturing floor space considerations. In the case of longer cords 11—11, the cords may not be unwound from the associated ones of the mandrels 12—12 in the same or slightly greater length of travel and with the same speed of rotation of the spindles 33—33. In these situations, the spindles 33—33 are turned rotatably at a higher rate of speed to impart more overtwist into the longer cords 11—11 than with the shorter cords during the linear movement of the carriage 31 in the first direction to shorten the effective length of the cords that are to be unwound.

With the longer cords 11—11, when the trailing end portions 16—16 are unwound from the associated ones of the mandrels 16—16, the cords will knot and kink up individually and tangle with adjacent cords. Therefore, provisions must be made to secure the trailing end portions 16—16 as the trailing end portions are unwound from the mandrels 12—12 and to rotate the spindles 33—33 a predetermined amount in a direction opposite of the first rotary direction to remove the overtwist from the cords 11—11. In order to accommodate relatively longer cords 11—11 in an existing apparatus of the type described hereinabove and secure the trailing end portions 16—16 thereof, a confining device, designated generally by the numeral 41 (see FIG. 1), is provided. The confining device 41 includes a stationary plate 42 which is attached to the base 21 intermediate the mandrels 12—12 and the carriage 31. The plate 42 is positioned so that as successive sections of the cords 11—11 are unwound from the mandrels 12—12, the successive sections are moved axially, generally perpendicular of the plate.

Moreover, the plate 42 is formed with a plurality of slots 43—43, designated further 43a—43d, cut vertically therein and aligned with associated ones of the bearing block supports 23a—23 and associated ones of the spindles 33a—33d. Each of the slots 43a—43d has a flared entrance 44 to facilitate the movement of portions of a cord 11 into the slot. The plate 42 is shaped so that adjacent ones of the slots 43a—43d are ascending from the forefront of the base 21, as viewed in FIG. 1, to the rear portion thereof to correspond to the aligned ascending supports 23a—23d and spindles 33a—33d.

Figure 2:
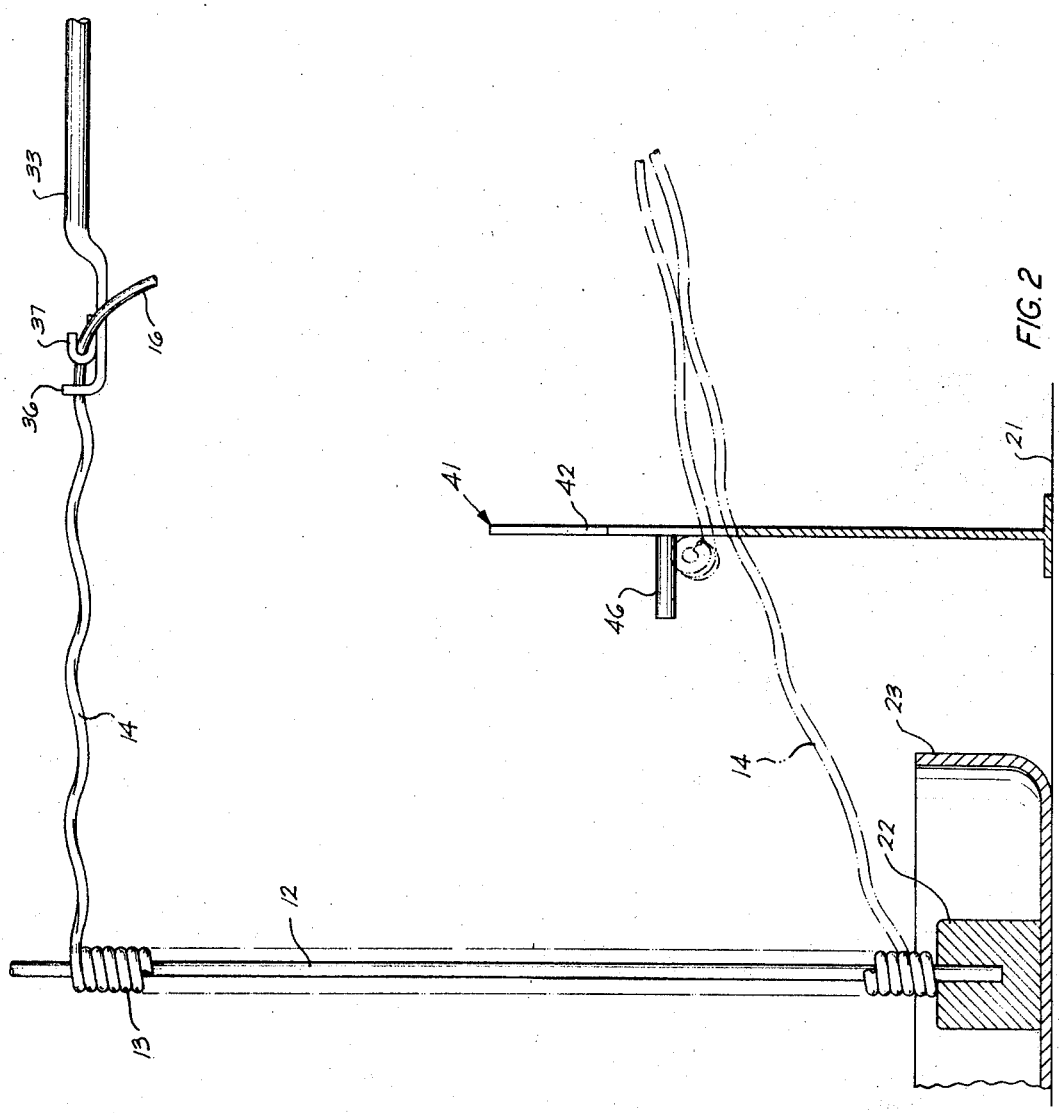
FIG. 2 is an elevational view of the apparatus of FIG. 1 and showing one of the spring cords wound on a mandrel being unwound therefrom at successive stages of the unwinding operation.

The width of the slot 43 is slightly greater than that of the diameter of the coils of the cord 11 when the cord is in an extended taut condition such as when the cord is being unwound from the mandrel (see FIG. 2). This diameter is less than the diameter of the convolutions 13—13 of the cord in a retracted condition but is greater than the diameter of the cordage 14.

As can best be seen in FIG. 1, the plate 42 is positioned on the base 21 substantially closer to the supports 23—23 than to the other end of the path of travel of the carriage 31 so that as the carriage is moved in the first direction toward the other end of the path of travel, the axes of the cords 11—11 are moved transversely of the plate. Portions of the cord 11 adjacent the end thereof are moved into and pulled through the associated one of the slots 43a–43d (see FIG. 3). Then, as the end of each of the cords 11—11 is unwound from the associated one of the mandrels 12—12 successive sections engage the bottom walls of the associated slots 43—43.

The confining device 41 has provisions for securing the last few convolutions adjacent the other end of each of the cords 11—11 when the cords are unwound completely from the mandrels 12—12. As can best be seen in FIG. 3, a pair of spaced pins 46—46 are attached to the plate 42 adjacent each one of the slots 43a–43d. The pins 46—46 project laterally of the plate 42 back toward the associated one of the mandrels 12—12 and are spaced apart a distance greater than the width of the slot 43.

One of the pins 46—46 of each pair of the pins is attached to the plate 42 on one side of the associated slot 43 and the other one of each pair of pins on the other side of the associated slot, both pins being on the mandrel-side of the plate 42. Also, as can best be seen in FIGS. 2 and 3, each pair of the pins 46—46 is attached to the plate 42 spanning the associated one of the slots 43a–43d with the pins spaced vertically above the bottom of the associated slot.

The pins 46—46 serve to prevent the sections of each of the cords 11—11 adjacent the end portions 16—16 thereof from being pulled through the associated ones of the slots 43—43 in the plate 42. As the trailing end portions 16—16 of the cords 11—11 are unwound from the mandrels 12—12, the last few convolutions 13—13 adjacent the end portion thereof expand and spring together on the mandrel-side of the plate 42. As the carriage 31 is further advanced in the first direction, the sections of each of the cords 11—11 adjacent the end portion 16 thereof tend to turn about a center within the associated slot 43. As the trailing end portion 16 turns, either the last few convolutions 13—13 or the trailing end portion engages the pins 46—46 to prevent further unscrewing of the remainder of the convolutions of the cord 11 through the slot. (See FIG. 4 which illustrates the condition where ones of the last few convolutions 13—13 engage one of the pins 46—46.) The engagement of the trailing end portion 16 or ones of the last few convolutions of the helical coil of each of the cords 11—11 with the pins 46—46 secures the end portion of each of the cords 11—11 to the confining device 41 after the carriage 31 has reached the end of the path of travel in the first direction, and prevents the trailing end portions from becoming disengaged with the confining device.

OPERATION

In carrying out the method of the invention with the apparatus which embodies the principles of the invention, the operator loads the apparatus 10 with a plurality of the mandrels 12—12 on each of which has been wound helically, and heat set, a spring cord 11. The operator positions the lower end of one of the mandrels 12—12 with a cord 11 wound helically thereon in one of the bearing blocks 22—22 and moves pivotally the topmost portion of the mandrel into the associated one of the slots 24a–24d in the top portion 26 of the bracket 27.

After the operator has positioned a loaded mandrel 12, the operator grasps the top free end portion 16 of the cord 11 and threads the top free end portion through the bifurcated end 34 of the aligned associated spindle 33, and turns the free end portion under the U-shaped portion 37 to secure the free end portion to the spindle. The operator positions additional ones of the mandrels 12—12 in the remaining ones of the bearings 22—22 and slots 24—24 and attaches similarly the free end portions 16—16 of the cords 11—11 coiled thereon to the associated ones of the spindles 33a–33d.

At this time, when all of the mandrels 12—12 are loaded and the free end portions 16—16 of the cords 11—11 coiled thereon are secured to the associated ones of the spindles 33—33, the carriage 31 is at one end of the path of travel adjacent the plate 42 toward the left end of the base 21, as viewed in FIG. 1.

Then the operator controls the operation of the carriage 31 to move the carriage from the initial position at the one end of the path of travel adjacent the plate 42, in the first direction, to the right as viewed in FIG. 1, to the other end of the path of travel. Simultaneously, the operator controls the operation of the apparatus 10 to rotate the spindles 33a–33d in the first rotary direction to reverse the pitch of the convolutions 13—13 of the coils as the cords 11—11 are unwound from associated ones of the mandrels 12—12.

During the unwinding and reversing of the cords 11—11, each of the cords assumes a tight, extended form having a substantially long lay (see FIGS. 1-3). The tight twisted form of each of the cords 11—11 serves to distribute the torque along the cords between the spindles and the mandrels and facilitates the transmission of torsional energy from associated ones of the spindles 33—33 to the associated mandrels 12—12.

As each of the cords 11—11 is unwound from associated ones of the mandrels 12—12, successive sections thereof are moved axially generally perpendicularly of the plate 42. Moreover, the axis of each of the cords 11—11 is moved transversely of the plate 42. Then, as the axis of each of the cords 11—11 becomes more and more inclined (see FIG. 2), portions of each of the cords adjacent the trailing end portion 16 thereof are moved into the associated flared entrance 44 and into the associated slot 43.

Also, it should be observed that only segments of the cords 11—11 adjacent the trailing ends thereof are moved into and through the associated ones of the slots 43a–43d. In this way, contact of the cords 11—11, with the walls of the slots 43a–43 is kept at a minimum while providing for catching and securing the trailing ends 16—16 of the cords to hold the cords strung out between the associated ones of the spindles 33a–33 and the mandrels 12—12.

The apparatus 10 is controlled to induce the predetermined overtwist into the cords 11—11 to impart sufficient torsional energy to the cords on the mandrels 12—12 to reverse the last few convolutions 13—13 of each of the cords adjacent the trailing end portions 16—16 thereof. Care must be taken to insure the transmittal of the additional energy from the spindles 32—32 to the mandrels 12—12 when successive sections of the cords 11—11 are moved through associated ones of the slots 43—43. The confining device 41 is designed so as not to interfere with the transmittal of the torsional energy up to the mandrels 12—12 which is required to reverse the of the last few ones of the convolutions 13—13. Hence, the slots 43—43 are dimensioned to be greater than the diameter of the cordage 14 and sufficiently wide to pass the tight long lay cord without inhibiting the distribution of the torque therealong.

As can best be seen in FIG. 2, as the last few convolutions 13—13 of the cord coils are unwound from the associated ones of the mandrels 12—12, the positioning of the plate 42, with respect to the mandrels and the length of travel of the carriage 31, is such that the axis of each of the cords extending between the associated mandrel and spindle 33, as viewed with the apparatus in front elevation, is not linear but is angled at the associated slot 43. Successive sections near the other end of each of the cords 11—11 are moved toward and then in engagement with the bottom wall of the associated slot 43.

The friction engagement of only segments of each of the cords 11—11 with the bottom wall of the associated one of the slots 43a–43d exerts a drag on the cords and permits the last few ones of the convolutions 13—13 thereof to expand to the original diameter thereof. The distance between the plate 42 and the mandrel 12—12 is determined to insure that the expansion of the last few ones of the convolutions 13—13 of each of the cords occurs before the last few ones of the convolutions engage the confining device 41.

After the ones of the last few convolutions 13—13 of the cords 11—11 are unwound and have expanded, the trailing end portion 16 or the ones of the last few convolutions engage one of the associated pair of pins 46—46 (see FIG. 4). This prevents sections of the cords adjacent the ends thereof from turning about the associated ones of the slots 43a—43d. As a result, the last few convolutions 13—13 of each of the cords 11—11 are held on the mandrel-side of the plate 42, with the cords 11—11 strung out between the associated slots 43a—43d and the associated spindles 33a—33d, while the overtwist is removed from the cords.

Then, the overtwist is removed from the cords 11—11 with the convolutions 13—13 remaining in the cord after the overtwist has been removed being of substantially uniform diameter, pitch and spacing. This is accomplished with the shorter spring cords 11—11 when the cord ends are released from the mandrels 12—12 and dangle from the associated spindles 33a—33d. With the longer cords 11—11, after the trailing ends of the cords 11—11 are secured in the confining device 41, the spindles 33—33 are rotated a predetermined amount in a direction opposite of the first rotary direction to remove the overtwist from the cords 11—11.

Should the operator release the cords 11—11 while the cords are in an extended condition before the overtwist has been removed therefrom, the cords will knot and kink up individually and tangle with adjacent cords. Then the movement of the carriage 31 is controlled to move the carriage in a second direction opposite to the first direction to return the carriage to the initial position where the operator removes the cords 11—11 from the apparatus 10. The removal of the overtwist is preferably accomplished simultaneous with the movement of the carriage in the second direction, but could be accomplished priorly thereto.

Then, when the carriage 31 has been returned to the initial position, the plurality of cords 11—11 are strung out in a generally catenary configuration between the plate 42 and associated ones of the spindles 33a—33d to facilitate removal by the operator. By securing the other end of each of the cords 11—11 as the cords are unwound completely from the mandrels 12—12, and continuing to hold both ends of each cord to maintain the cord strung out either in a taut or in a catenary position, entanglement of adjacent ones of the cords is avoided as well as knotting or kinking of individual ones of the cords. Moreover, this arrangement permits control of the removal of the overtwist.

It is to be understood that the above-described arrangements are simply illustrative of the principles of the invention. Other arrangements may be devised by those skilled in the art which will embody the principles of the invention and fall within the spirit and scope thereof.

I claim:

1. A method of unwinding a helically wound elongated body, which includes the steps of:
holding one end of the elongated body;
causing relative movement between the one end and the wound portion of the helically wound elongated body to unwind the elongated body while moving successive unwound portions thereof transverse of a confining device; and
engaging unwound portions of the elongated body adjacent to the other end of the elongated body prior to the elongated body being unwound to secure the other end of the elongated body when the elongated body is unwound completely.

2. A method of unwinding a helically wound elongated body, which includes the steps of:
holding one end of the elongated body;
causing relative movement between the one end and the wound portion of the helically wound elongated body to unwind the elongated body to move successive portions thereof axially generally transversely of a confining device while moving simultaneously the longitudinal axis of the elongated body transversely of the confining device; and
engaging only a segment of the unwound portions of the elongated body adjacent to the other end of the elongated body prior to the elongated body being unwound to secure the other end of the elongated body when the elongated body is unwound completely.

3. A method of unwinding and reversing the pitch of a helically wound elongated body, which includes the steps of:
holding one end of the elongated body;
twistingly rotating the ends of the helically wound elongated body relative to each other to reverse the direction of the coil thereof;
causing relative movement between the one end and the wound portion of the helically wound body to unwind the elongated body while moving successive unwound portions thereof transverse of a confining device; and
engaging unwound portions of the elongated body adjacent to the other end of the elongated body prior to the elongated body being unwound to secure the other end of the elongated body when the elongated body is unwound completely.

4. A method of unwinding and reversing the pitch of a helically wound elongated body, which includes the steps of:
holding one end of the elongated body;
twistingly rotating the ends of the helically wound elongated body relative to each other to reverse the direction of the coil thereof;
causing relative movement between the one end and the wound portion of the helically wound body to unwind the elongated body and move successive unwound portions thereof axially generally transversely of a confining device while moving simultaneously the longitudinal axis of the elongated body transversely of the confining device; and
engaging only a segment of the unwound portions of the elongated body adjacent to the other end of the elongated body prior to the elongated body being unwound to secure the other end of the elongated body when the elongated body is unwound completely.

5. A method of unwinding and reversing the pitch of a retratile cord, wound helically on a mandrel, which includes the steps of:
gripping one end of the cord;
twistingly rotating the ends of the cord relative to each other to reverse the direction of the helical coil;
pulling the one end of the cord from an initial position axially in a first direction to unwind the cord from the mandrel and advance successive unwound portions thereof generally perpendicular of a slotted guide while moving simultaneously the axis of the cord transversely of the guide to pull unwound portions of the cord adjacent the other end thereof through the slotted guide; and
engaging only a segment of the unwound portions of the cord adjacent the other end of the cord in the vicinity of the initial position after the last few convolutions are unwound from the mandrel to secure the other end of the cord when the cord is completely unwound.

6. A method of unwinding and reversing the pitch of a cord wound helically on a mandrel, which includes the steps of:
gripping one end of the cord;
twistingly rotating the ends of the cord in a first rotary direction relative to each other to reverse the pitch of the helical coil and thereafter overtwisting the cord by continuing the relative rotation of the ends to form additional convolutions of the reversed direction in the coiled portion;
pulling the one end of the cord in a first direction and through a predetermined distance to unwind the cord to move successive portions thereof axially generally perpendicular of a slotted guide while moving simultaneously the axis of a cord transversely of the guide to pull portions of the cord adjacent the other end thereof through the slotted guide;

engaging only a segment of the unwound portions of the cord adjacent to the other end thereof and prior to the cord being unwound completely from the mandrel to retain ones of the last few convolutions of the cord in engagement with the guide and maintain the coil axis longitudinal of the helices of the cord in a taut essentially linear configuration with adjacent ones of the helices being spaced apart; and twistingly rotating the ends of the cord in a second rotary direction opposite to the first rotary direction to remove the overtwist from the cord while moving the other end of the cord in a second linear direction opposite to the first linear direction until the coil axis is substantially catenary in configuration with adjacent ones of the helices abutting one another.

7. A method of reversing the pitch of a plurality of spring cords formed in helical coils on mandrels, which includes the steps of:

mounting rotatably and individually the mandrels;

clamping one end of each of the cords in a rotatably mounted spindle;

twistingly rotating in a first rotary direction the ends of each of the cords relative to each other to reverse the direction of the coils and thereafter over-twisting the spring cords by continuing the relative rotation of the ends to form additional helices of the reversed direction in the coiled portion;

pulling the one end of each of the cords in a first linear direction to unwind successive ones of the convolutions from the associated mandrel and advance successive sections of the cord axially generally perpendicular to a plate having a plurality of slots cut therein, each of the slots being aligned with one of the mandrels and an associated one of the spindles, while moving simultaneously the axis of each of the cords transversely of the plate to pull portions of the cord adjacent the other end thereof through the associated one of the slots;

engaging portions of each of the cords adjacent to the other ends thereof as the other end of each of the cords is withdrawn from the mandrel to retain ones of the last few convolutions of each of the cords on the mandrel-side of the plate and maintain the convolutions of each of the cords spaced apart and strung out between the plate and the associated spindle with the longitudinal axis of the coil being essentially in a taut extended configuration; and twistingly rotating in a second rotary direction opposite to the first rotary direction the ends of the cords relative to each other to remove the overtwist from the cords while simultaneously moving the other ends of the cords in a second linear direction opposite to the first linear direction to have the longitudinal axis of the coil assume a retracted generally catenary configuration.

8. An apparatus for unwinding a helically wound elongated body, which comprises:

means for holding one end of the elongated body;

means for causing relative movement between the one end and the wound portion of the helically wound elongated body to unwind the elongated body; and means for engaging only a segment of the unwound portions of the elongated body adjacent to the other end of the elongated body prior to the elongated body being unwound to secure the other end of the elongated body when the elongated body is completely unwound.

9. An apparatus for unwinding a helically wound elongated body, which includes:

means for holding one end of the elongated resilient body;

means for confining portions of the elongated body;

means for causing relative movement between the one end and the wound portion of the helically wound resilient body to unwind the elongated body to move successive portions thereof axially generally of the confining means, while moving simultaneously the axis of the body transverse of the confining means; and means mounted on the confining means for engaging unwound portions of the elongated body adjacent to the other end of elongated body subsequent to the elongated body being completely unwound to secure the other end of the elongated body when the elongated body is completely unwound.

10. An apparatus for simultaneously unwinding and reversing the pitch of an elongated resilient body wound helically on a workholder, which comprises:

means for holding one end of the elongated resilient body;

means for twistingly rotating the ends of the resilient body with respect to each other to reverse the pitch of the resilient body;

means for causing relative movement between the one end and the unwound portions of the resilient body to unwind the resilient body from the workholder and pull the other end from the mandrel; and means for engaging only a segment of the unwound portions of the resilient body adjacent the other end of the resilient body prior to the elongated body being completely unwound from the workholder to secure the other end of the resilient body when the resilient body is completely unwound from the workholder.

11. An apparatus for simultaneously unwinding and reversing the pitch of an elongated resilient body wound helically on a workholder, which comprises:

means for holding one end of the elongated resilient body;

means for twistingly rotating the ends of the resilient body with respect to each other to reverse the pitch of the resilient body;

means for causing relative movement between the one end and unwound portions of the resilient body to move successive unwound portions axially generally transverse of the workholder while moving simultaneously the axis of the body generally transverse of the workholder; and means for engaging unwound portions of the elongated body adjacent to the other end of the elongated body prior to the elongated body being unwound completely from the workholder to secure the other end of the elongated body when the elongated body is completely unwound.

12. An apparatus for simultaneously unwinding and reversing the pitch of an elongated resilient body wound helically on a mandrel, which comprises:

means for mounting rotatably the mandrel;

means for gripping one end of the resilient body;

means for advancing the one end of the resilient body in a first direction through a predetermined distance to unwind the resilient body from the mandrel;

means for twistingly rotating in a first rotary direction the ends of the resilient body with respect to each other to reverse the pitch of the resilient body and subsequent to the one end having been advanced through the predetermined distance to twistingly rotate in a second rotary direction opposite the first rotary direction the ends to remove the overtwist therefrom;

means for engaging the last few convolutions of the resilient body adjacent the other end thereof as the other end of the resilient body is withdrawn from the mandrel to hold the resilient body strung between the gripping means and the engaging means with the convolutions in an extended condition and a longitudinal axis of the helical coil generally taut; and means for moving the other end of the body in a second direction opposite to the first direction with the convolutions retracted and the longitudinal axis generally in a catenary configuration.

13. An apparatus for reversing the pitch of a retractile cord wound helically on a mandrel, which comprises:

a frame;

means for mounting rotatably the mandrel on the frame;

means mounted reciprocally on the frame for holding one end of a retractile cord;

means for causing relative movement between the holding means and the means for mounting rotatably the mandrel and for rotating the holding means to unwind the convolutions of the cord from the mandrel and to reverse the pitch of the cord;

a stationary plate attached to the frame and positioned between the means for mounting rotatably the mandrel and the holding means, the plate having a slot cut therein and aligned with the axis of the cord as strung between the holding means and the mandrel;

the cord having successive sections thereof moved axially generally perpendicular of the plate and transverse of the axis of the mandrel, the axis of the cord being moved transversely of the plate to move portions of the cord adjacent the other end thereof into and through the slot; and means attached to the plate for engaging ones of the last few convolutions of the cord as the other end of the cord is unwound from the mandrel and for retaining the last few convolutions of the cord on the mandrel-side of the plate to maintain the cord strung between the plate and the holding means.

14. An apparatus for unwinding and reversing the pitch of the helices of a plurality of retractile cords, each of the retractile cords being wound helically on a mandrel, which comprises:

a frame;

means for mounting rotatably the mandrels on the frame;

a carriage mounted reciprocally on the frame;

a plurality of spindles rotatably mounted on the carriage, each of the spindles adapted to hold one end of the one of the retractile cords, further each of the spindles aligned with one of the mandrels;

means for moving the carriage from an initial position in a first direction relative to the mandrels to unwind the cords from the associated mandrels;

means responsive to the movement of the carriage in the first direction for rotating the spindles in a first rotary direction to reverse the pitch of the helices of the cords and for overtwisting the cords to form additional helices of the reversed direction in the coiled portion;

a stationary plate attached to the frame and positioned between the means for mounting rotatably the mandrels and the carriage, the plate having a plurality slots cut therein, each of the slots aligned with the axis of an associated one of the cords as strung between the spindles and the mandrels;

the cords having successive sections thereof moved axially generally perpendicular of the plate and transverse of the axis of the associated mandrels, the axes of the cords being moved transversely of the plate to move portions of the cords adjacent the other ends thereof into and through the associated ones of the slots;

means attached to the plate for engaging portions of the cords adjacent the other ends thereof as the other ends of the cords are unwound from the associated ones of the mandrels and for retaining at least few convolutions of the cords on the mandrel-side of the plate to maintain the cords strung between the plate and the associated ones of the spindles;

means for moving the carriage in a second direction opposite to the first direction to return the carriage to the initial position; and means responsive to the movement of the carriage in the second direction for rotating the spindles in a second rotary direction opposite to the first rotary direction to remove the overtwist from the cords.

15. An apparatus for unwinding and reversing the pitch of the helices of a plurality of retractile cords, each of the retractile cords being wound helically on a mandrel, which comprises:

a frame;

means for mounting rotatably the mandrels on the frame;

a carriage mounted reciprocally on the frame;

a plurality of spindles rotatably mounted on the carriage, each of the spindles adapted to hold one end of one of the retractile cords, further each of the spindles aligned with one of the mandrels;

means for moving the carriage from an initial position in a first direction relative to the mandrels to unwind the cords from the associated mandrels;

means responsive to the movement of the carriage in the first direction for rotating the spindles in a first rotary direction to reverse the pitch of the helices of the cords and for overtwisting the cords to form additional helices of the reversed direction in the coiled portion;

a stationary plate attached to the frame and positioned between the means for mounting rotatably the mandrels and the carriage, the plate having a plurality of slots cut therein, each of the slots aligned with the axis of an associated one of the cords as strung between the spindles and the mandrels;

the cords having successive sections thereof moved axially generally perpendicular of the plate and transverse of the axis of the associated mandrels, the axes of the cords being moved transversely of the plate to move portions of the cords adjacent the other ends thereof into and through the associated one of the slots;

the cords having still further successive sections thereof adjacent the other ends thereof engage the bottom walls of the associated slots as the trailing end portions are unwound from the mandrels to permit the last few convolutions to expand to an original diameter;

a plurality of pairs of pins attached to the plate and extending laterally therefrom toward the means for mounting the mandrels, each pair of the pins associated with one of the slots, one of each pair of the pins being on one side of the associated slot and the other one of the pair on the otheside of the associated slot, further each pair of the pins being spaced above the bottom of the associated slot;

each pair of the pins engaging portions of the cords adjacent the other ends thereof after the last few convolutions thereof have expanded on the mandrel side of the plate for retaining the last few convolutions of the cords on the mandrel-side of the plate to maintain the cords strung between the plate and the associated ones of the spindles;

means for moving the carriage in a second direction opposite to the first direction to return the carriage to the initial position; and means responsive to the movement of the carriage in the second direction for rotating the spindles in a second rotary direction opposite to the first rotary direction to remove the overtwist from the cords.

* * * * *

L-566-PT
(6-69)

UNITED STATES PATENT OFFICE
CERTIFICATE OF CORRECTION

Patent No. 3,656,516  Dated April 18, 1972

Inventor(s) EDWIN C. HARDESTY

It is certified that error appears in the above-identified patent and that said Letters Patent are hereby corrected as shown below:

In the specification, Column 5, line 25, following "order" insert --to--. Column 5, line 47, "27" should read --37--. Column 6, line 12, "33" should read --33d--. Column 6, line 61, "23a-23" should read --23a-23d--. Column 8, line 38, "43a-43" should read --43a-43d--. Column 8, line 41, "33a-33" should read --33a-33d--. Column 9, line 52, "I claim:" should read --What is claimed is"--. Column 10, line 73, "a" should read --the--. Column 12, line 17, "mandrel" should read --workholder--. Column 13, line 30, delete second "the". Column 13, line 57, "at least" should read --the last--. Column 14, line 47, "otheside" should read --otherside--.

Signed and sealed this 14th day of January 1975.

(SEAL)
Attest:

McCOY M. GIBSON JR.
Attesting Officer

C. MARSHALL DANN
Commissioner of Patents